(12) United States Patent
Bröker et al.

(10) Patent No.: US 7,357,591 B2
(45) Date of Patent: Apr. 15, 2008

(54) BALL-AND-SOCKET JOINT

(75) Inventors: Klaus Bröker, Bohmte-Hunteburg (DE); Helmut Noe, Hörstel (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 95 days.

(21) Appl. No.: 10/477,673

(22) PCT Filed: Jan. 9, 2003

(86) PCT No.: PCT/DE03/00048

§ 371 (c)(1),
(2), (4) Date: Nov. 12, 2003

(87) PCT Pub. No.: WO03/058080

PCT Pub. Date: Jul. 17, 2003

(65) Prior Publication Data

US 2004/0146338 A1    Jul. 29, 2004

(30) Foreign Application Priority Data

Jan. 11, 2002 (DE) ............................. 102 01 022

(51) Int. Cl.
*F16C 11/00* (2006.01)

(52) U.S. Cl. ............... 403/132; 403/122; 403/133; 403/135

(58) Field of Classification Search ............ 403/122, 403/132, 133, 135, 128
See application file for complete search history.

(56) References Cited

U.S. PATENT DOCUMENTS

| | | | | |
|---|---|---|---|---|
| 3,005,647 A | * | 10/1961 | Collier | 403/125 |
| 3,108,830 A | * | 10/1963 | Fierstine | 403/140 |
| 3,350,122 A | | 10/1967 | Ulderup | |
| 3,381,987 A | * | 5/1968 | Husen | 403/51 |
| 4,259,027 A | * | 3/1981 | Hata | 403/132 |
| 4,883,263 A | * | 11/1989 | Buhl | 267/293 |
| 4,974,985 A | * | 12/1990 | Glatzel | 403/114 |

(Continued)

FOREIGN PATENT DOCUMENTS

DE          39 40 679          6/1991

(Continued)

*Primary Examiner*—Daniel P. Stodola
*Assistant Examiner*—Daniel J. Mills
(74) *Attorney, Agent, or Firm*—McGlew and Tuttle, P.C.

(57) ABSTRACT

A ball-and-socket joint has a pivot pin accommodated rotatably and tiltably with a spherical joint area in a bearing shell. The bearing shell is in turn arranged in the recess of a joint housing. A closing ring fixes the bearing shell in the joint housing in the axial longitudinal direction of the pivot pin by at least one surface pair. Corresponding to a first solution variant, an intermediate element made of an elastic material may be arranged between the corresponding contact surfaces of the surface pair on the bearing shell and the closing ring. As an alternative an insert element may be arranged between the outer contour of the bearing shell and the bottom area of the recess, wherein at least one intermediate element made of an elastic material is arranged between the outer surface of the insert element and the corresponding inner surface of the recess. The requirement imposed on the dimensional accuracy of the ball-and-socket joint components can be substantially reduced due to these solution variants, which contributes to a reduction of the manufacturing costs.

20 Claims, 5 Drawing Sheets

U.S. PATENT DOCUMENTS

| | | | |
|---|---|---|---|
| 5,066,159 A * | 11/1991 | Urbach | 403/134 |
| 5,067,841 A * | 11/1991 | Fukukawa et al. | 403/140 |
| 5,230,580 A * | 7/1993 | Henkel | 403/135 |
| 5,395,176 A * | 3/1995 | Zivkovic | 403/122 |
| 5,601,305 A | 2/1997 | Nordloh et al. | |
| 5,704,727 A * | 1/1998 | Atkins et al. | 403/135 |
| 5,752,780 A * | 5/1998 | Dorr | 403/135 |
| 5,782,574 A * | 7/1998 | Henkel | 403/135 |
| 6,113,302 A * | 9/2000 | Buhl | 403/133 |
| 6,488,436 B1 * | 12/2002 | Modat | 403/135 |
| 6,719,476 B2 * | 4/2004 | Hisi | 403/137 |
| 6,773,196 B2 * | 8/2004 | Broker et al. | 403/133 |
| 6,821,047 B2 * | 11/2004 | Broker | 403/132 |
| 6,857,810 B2 * | 2/2005 | Ersoy et al. | 403/131 |
| 6,902,345 B2 * | 6/2005 | Kur | 403/135 |
| 2001/0036385 A1 * | 11/2001 | Menotti | 403/135 |
| 2003/0077114 A1 * | 4/2003 | Broker et al. | 403/135 |
| 2003/0081989 A1 * | 5/2003 | Kondoh | 403/135 |
| 2004/0057781 A1 * | 3/2004 | Bohne et al. | 403/135 |
| 2004/0202507 A1 * | 10/2004 | Kur | 403/135 |
| 2005/0105961 A1 * | 5/2005 | Kondoh | 403/122 |

FOREIGN PATENT DOCUMENTS

| | | | |
|---|---|---|---|
| DE | 195 42 071 | | 5/1997 |
| DE | 197 55 284 | | 6/1999 |
| WO | WO 0159312 | * | 8/2001 |

* cited by examiner

BALL-AND-SOCKET JOINT

FIELD OF THE INVENTION

The present invention pertains to a ball-and-socket joint with a pivot pin, which is accommodated rotatably and tiltably with a spherical joint area in a bearing shell, which is in turn arranged in the recess of a joint housing, wherein a closing ring fixes the bearing shell in the joint housing in the axial longitudinal direction of the pivot pin by at least one contact surface.

BACKGROUND OF THE INVENTION

Various different designs of ball-and-socket joints of the type described in the introduction have been known from the state of the art, and they are used, in particular, in vehicles and steering mechanisms of passenger cars and utility vehicles. A decisive criterion for the quality of the ball-and-socket joints used is their service life, which should be sufficiently long under difficult stress conditions. An essential requirement for ensuring a sufficient service life is the narrowest possible tolerances of the ball-and-socket joint components, and what is especially significant is the spherical joint area of the pivot pin, the bearing shell accommodating same, as well as the fixation of the bearing shell by the closing ring in the joint housing in relation to narrow dimensional tolerances. The closing rings used are often manufactured by a turning operation and are especially sensitive in respect to radial displacements in relation to the longitudinal axis of the pivot pin at the time of mounting. The mounting is usually performed by a rolling operation, as a result of which a one-sided contact of the bearing shell with the closing ring may develop, which leads to premature wear of the joint and as a consequence of this to an excessive clearance in the joint.

SUMMARY OF THE INVENTION

The object of the present invention is therefore to improve a ball-and-socket joint of this type such that the high requirements in terms of dimensional tolerances which affect the service life can be reduced during the manufacture of the ball-and-socket joint.

According to the invention, a ball-and-socket joint is provided with a pivot pin accommodated rotatably and tiltably with a spherical joint area in a bearing shell. The bearing shell is in turn arranged in a recess of a joint housing. A closing ring fixes the bearing shell in the joint housing in the axial longitudinal direction of the pivot pin by at least one surface pair. An intermediate element made of an elastic material (elastic element) is arranged between the corresponding contact surfaces on the bearing shell and the closing ring. The intercalation of the elastic element permits within certain limits an oblique position of the contact surfaces for fixing the bearing shell, so that the function of the ball-and-socket joint is essentially preserved both in the new state and after a wear situation resulting from the advanced duration of use, because tilting between the bearing shell and the closing ring is prevented from occurring. Increased tolerances as a consequence of advanced wear can be avoided by a defined pretension of the intermediate element.

In addition, axial tolerances can also be compensated within certain limits. A reduction of the manufacturing costs of the individual components of the ball-and-socket joint and consequently an overall cost advantage are achieved due to the design according to the present invention without adverse effects on the desired long service life having to be feared.

Corresponding to an advantageous variant of the subject of the present invention, the intermediate element may be designed as an elastomer layer. This elastomer layer may be advantageously vulcanized or bonded to the closing ring. The handling of different individual parts during the mounting of the ball-and-socket joint is avoided by this measure, and, moreover, the amount of parts to be stocked is reduced.

Moreover, the dimensional tolerances of the closing ring can be additionally reduced by arranging an additional intermediate element made of an elastic material between the closing ring and the inner wall of the recess that accommodates the bearing shell and in which the closing ring is usually fixed by a step. According to an advantageous variant, this additional intermediate element may likewise be designed as an elastomer layer, and the handling is again facilitated by the intermediate element or the elastomer layer being vulcanized or bonded to the closing ring.

To eliminate another cause for increased wear and the reduced service life resulting therefrom, the first intermediate element may have locking means for rotatorily fixing the bearing shell at the intermediate element in relation to the longitudinal axis of the pivot pin according to an advantageous embodiment of the idea of the present invention. Rotation around the longitudinal axis of the pivot pin or a relative movement between the corresponding components, which would inevitably lead to a premature wear as a consequence of the increased wear, is thus prevented.

As an alternative to the technical teaching described so far, another solution to the object is essentially that an insert element, which is arranged between the outer surface of the bearing shell and the inner surface of the recess accommodating the bearing shell in the bottom area of the recess, has an intermediate element made of an elastic material on at least part of the outer surface of the insert element. The intermediate element may be arranged between the insert element and the inner surface of the recess, or it may be provided between the bearing shell and the insert element.

The properties of the elastic intermediate element likewise act as a tolerance compensation and can, moreover, compensate wear-induced increases in the clearance between the corresponding components within certain limits. In addition, the intermediate element may exert a damping action, and, in particular, impact forces acting on the ball-and-socket joint in the axial direction can be absorbed by the elastic intermediate element. Corresponding to an advantageous variant, the intermediate element may be designed as an elastomer layer, which is arranged both in the bottom area and in the lateral area between the insert element and the recess accommodating same. Vulcanization or bonding to the insert element is available for easier handling for the intermediate element made of an elastic material as well as for its variant as an elastomer layer.

The two solutions according to the present invention will be explained in greater detail below on the basis of several exemplary embodiments, which are shown in the drawings attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
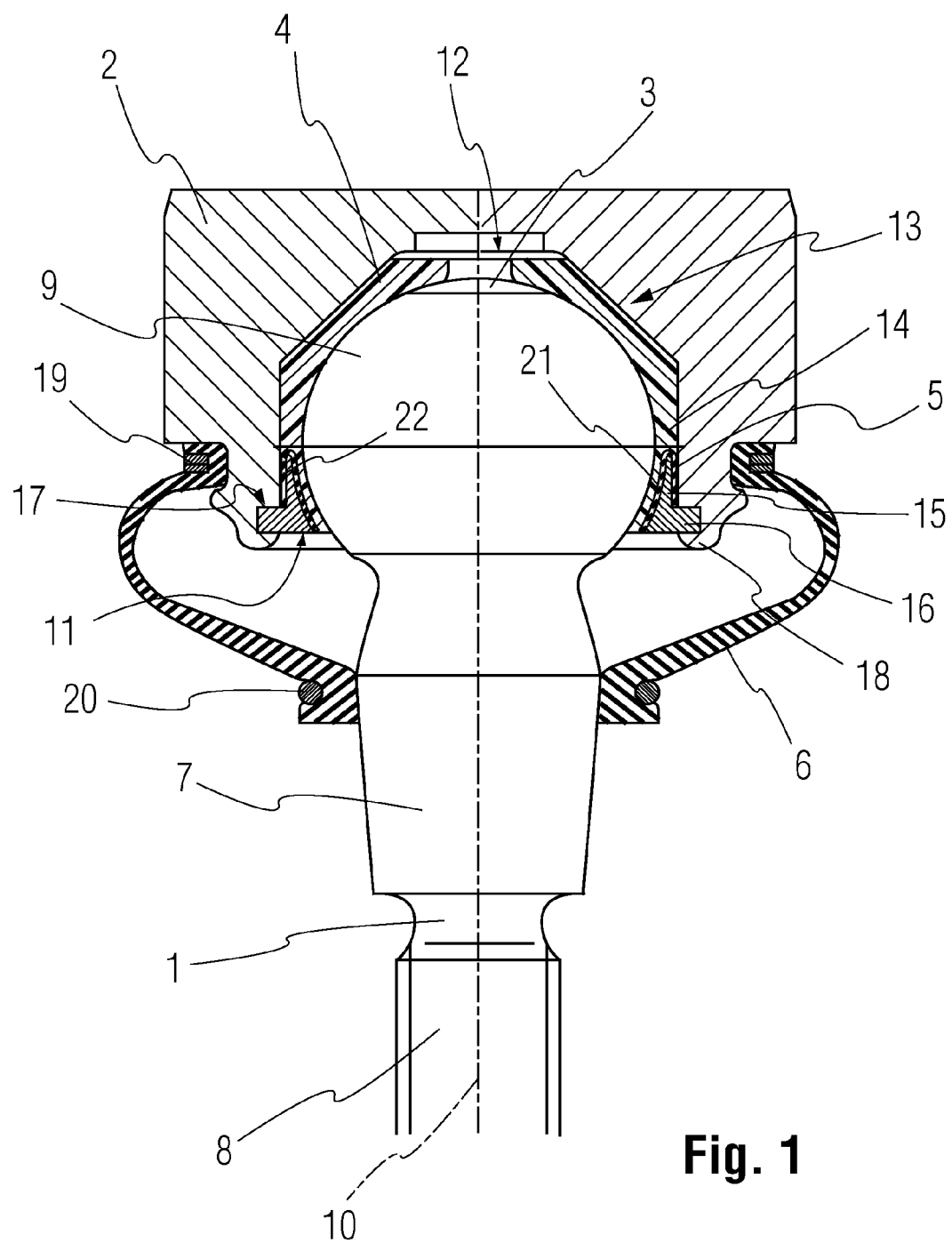
FIG. 1 is a sectional view through a first exemplary embodiment for the first solution variant of the present invention.

Referring to the drawings in particular, FIG. 1 shows a ball-and-socket joint, which comprises essentially a pivot pin 1, a joint housing 2, a one-part or multipart bearing shell 4 arranged within a recess 3 of the joint housing 2, a closing ring 5 as well as a sealing bellows 6 consisting of an elastic material. Such a ball-and-socket joint may be used, e.g., in motor vehicles and specifically in the chassis or on steering mechanism parts of passenger cars and utility vehicles. It is used to make possible a controlled rotary and tilting movement between two components, wherein the pivot pin with its free end projecting from the joint housing, which has a cone 7 and a threaded fastening end 8 joining the cone is fixed at a motor vehicle component. The other, movable component corresponding to this is fixed to the joint housing 2 with fastening means not specifically shown here. At the end located opposite the fastening end 8, the pivot pin 1 has a spherical joint area 9, which is arranged within the joint housing 2 and is fixed in the hollow spherical inner contour of the bearing shell 4 there such that both a rotary movement around the longitudinal axis 10 of the pivot pin and a tilting movement in relation to this longitudinal axis 10 of the pivot pin are possible. The recess 3, which accommodates the bearing shell 4, has an outer cylindrical hole part provided with an opening 11 as well as a truncated cone-shaped hole area 13 extending to the bottom 12 of the recess 3. The bearing shell 4 is first inserted during the mounting into the recess 3 of the joint housing 2, and the joint area 9 of the pivot pin 1 is then inserted into the bearing shell 4, the latter operation being able to be performed by means of a pressing-in operation. The thin, elastically deformable areas 14 of the bearing shell 4, which are directed toward the opening 11, are now pressed toward the outside and again fall back into their original position after the introduction of the pivot pin 11, because the bearing shell consists of an elastic plastic material. According to another variant of the mounting of the pivot pin, the thin areas 14 of the bearing shell 4 may have a cylindrical shape in the unassembled state of the ball-and-socket joint, so that the pivot pin can be inserted into the bearing shell without bending the areas 14.

In another operation, the opening 11 of the joint housing 2 is subsequently closed with the closing ring 5. The closing ring 5 comprises essentially two cylindrical areas or portions 15 and 16, the area 15 being designed as a ring projecting in the axial direction toward the inside of the joint housing 2. The inner surface of the area 15 facing the bearing shell 4 has a spherical design here and forms a contact surface for the bearing shell 4 together with the front area of the closing ring 5 directed toward the inside of the joint housing and secures the fixation of the bearing shell in the axial longitudinal direction of the longitudinal axis 10 of the pivot pin.

Should the thin areas 14 of the bearing shell 4 have a cylindrical shape in the unassembled state of the ball-and-socket joint, the area 15 of the closing ring 5 ensures the contact of the areas 14 of the bearing shell 4 with the joint area 9 of the pivot pin 1 during the mounting the ball-and-socket joint, and the bearing shell 4 may be provided with axial longitudinal slots for easier deformation.

The area 16 joining the area 15 of the closing ring 5 has a larger external diameter than the area 15 and is in contact with a step 17 of the joint housing 2. The closing ring 5 is subjected to a rolling operation within the framework of the mounting of the ball-and-socket joint, while the edge of the joint housing is deformed in some sections, but preferably beaded. The closing ring can be fixed by means of this deformation operation, which generates a beaded edge 18 on the axial outer side of the closing ring 5. The opening 11 of the joint housing 2 is closed in a final manufacturing step by means of a sealing bellows 6, which is arranged between the joint housing 2 and the cone 7 of the pivot pin 1 and is held in its position by means of straining rings 19 and 20.

In the exemplary embodiment shown in FIG. 1, the closing ring 5 is also provided with an elastic intermediate element 21 on its inner surface facing the bearing shell 4, and the elastic intermediate element 21 is designed as an elastomer layer in this exemplary embodiment, and it also extends around the front-side end of the closing ring. The elastomer layer was applied by vulcanization in a preceding, separate operation, and bonding of the intermediate element 21 with the closing ring 5 may also be provided as an alternative form of fastening.

Due to this measure, the bearing shell 4 is fixed in the axial longitudinal direction, on the one hand, and the elastomer layer acting as an intermediate element 21 can compensate dimensional inaccuracies between the corresponding contact surfaces of the surface pair formed by the bearing shell 4 and the closing ring 5, on the other hand. This compensation of dimensional inaccuracies can also be improved by arranging an additional intermediate element 22 at the cylindrical outer surface of the closing ring 5 in the area in which it is accommodated in the cylindrical area of the recess 3. This additional intermediate element 22 is likewise made of an elastic material and is preferably likewise designed as an elastomer layer vulcanized or bonded to the closing ring 5. Differences in diameter between the recess 3 in the joint housing 2 and the closing ring 5 can also be compensated by means of this additional intermediate element 22.

Figure 2:
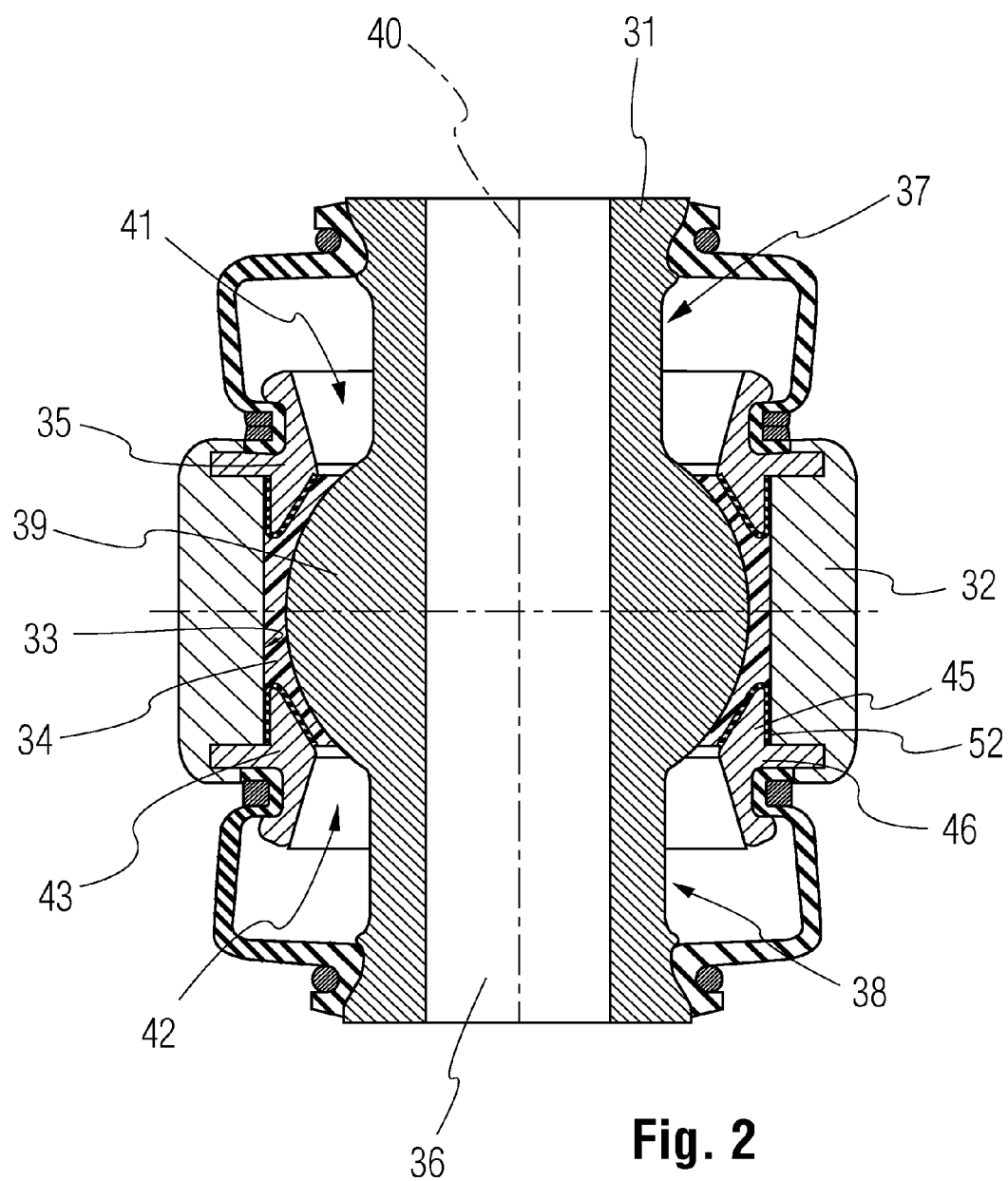
FIG. 2 is another solution embodiment of the first solution variant.

FIG. 2 shows a ball-and-socket joint which is also called especially a ball sleeve joint. This special form of the ball-and-socket joint likewise has a joint housing 32, in the essentially cylindrical recess 33 of which a bearing shell 34 is accommodated. The bearing shell 34 is in turn provided with a spherical segment-like inner surface, which accommodates a pivot pin 31.

Contrary to the view in FIG. 1, the pivot pin 31 has a modified form with a central cylindrical hole 36, a centrally arranged joint area 39 and, adjoining in on both sides, with outwardly extending, likewise essentially cylindrical areas 37 and 38. The areas 37 and 38 project from the joint housing 32 on both sides, because of which the joint housing is provided with corresponding openings 41 and 42. The task of such a ball-and-socket joint is in turn to make possible a controlled movement of two adjacent components in relation to one another. One component is accommodated here within the hole 36, and the other component, which is rotatable and tiltable in relation to this component, is fastened on the outside of the joint housing 2 in a mount not specifically shown here.

The bearing shell 34 is fixed in this exemplary embodiment by means of two closing rings 35 and 43 in the axial direction of the longitudinal axis 40 of the pivot pin. For fixing the bearing shell 34, these closing rings 35 and 43 have essentially the same shape as was already described in detail in the description of FIG. 1. Accordingly, the closing rings 35 and 43 have an area 45, which is directed toward the inside of the joint housing 32, has a cylindrical outer contour and is adapted on its inner side to the outer contour of the bearing shell 34, which said outer contour has a conical design in the area of the surface pair in this exemplary embodiment. The surface of the area 45 facing the bearing shell forms a contact surface for the axial fixation of the bearing shell 34. The area 45 is joined toward the outside by an area 46, which has essentially a ring-shaped design and has a larger external diameter than the area 45. The outer edges of the joint housing 32 are likewise turned over by means of a rolling operation after the installation of the bearing shell 34 as well as the closing rings 35 and 43, so that the closing ring is firmly connected to the joint housing 32. Analogously to the description of the present invention given on the basis of FIG. 1, the two closing rings 36 and 43 are provided with an elastic intermediate element 51, 52 in the form of an elastomer layer on the outer surface of the area 45 on the inside and on the outside. The elastomer layer may be bonded or vulcanized to the surface of the closing rings 35 and 43. Analogously to the exemplary embodiment according to FIG. 1 and because of the elastic properties of the intermediate elements 51 and 52, the intermediate elements 51 and 52 form the possibility of tolerance compensation between the closing rings 35 and 43, between the joint housing 32 and the bearing shell 34, so that much lower requirements are to be imposed on the dimensional accuracy of these components of the ball-and-socket joint if the elastomer layers are present. This leads, on the one hand, to a reduction of the manufacturing costs due to a low percentage of rejects and, moreover, to an improvement in service life, because the elastomer layers applied can also compensate a certain amount of tolerance arising as a consequence of wear phenomena on the ball-and-socket joint.

Figure 3:
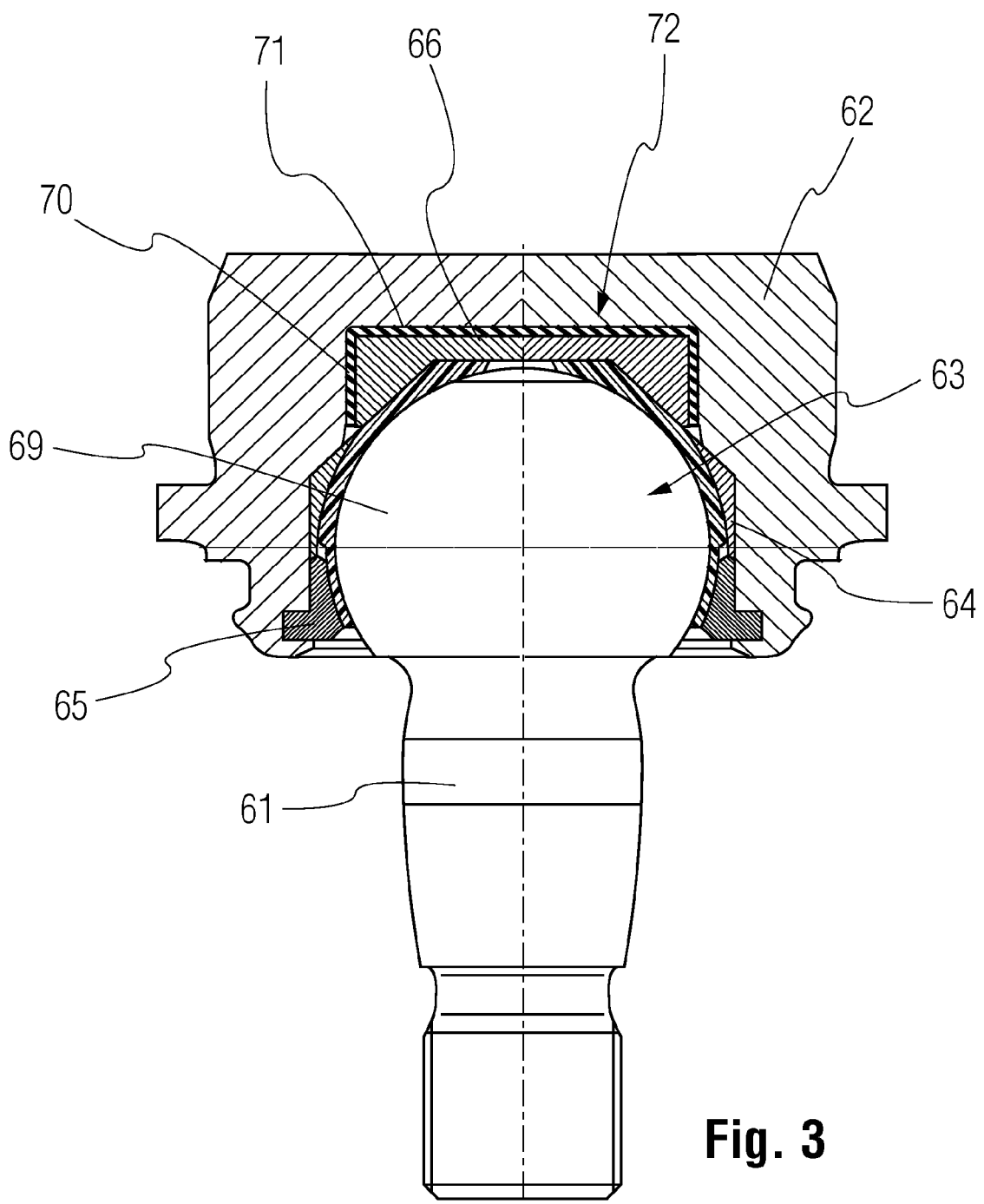
FIG. 3 is a sectional view through a ball-and-socket joint with the features of the second solution variant of the subject of the present invention.

The exemplary embodiment according to FIG. 3 corresponds in the design principle of its essential elements to that according to FIG. 1. A pivot pin 61 is likewise mounted rotatably and tiltably in a joint housing designated by reference number 62 in this exemplary embodiment as well. The mounting is performed in such a way that a spherical joint area 69 is accommodated in a corresponding hollow spherical bearing shell 64. The bearing shell 64 is in turn accommodated in a recess 63 of the joint housing 62, and, contrary to the view in FIG. 1, an insert element 66 is located in the bottom area 72. The insert element 66 is preferably made of steel and has in FIG. 3 a cylindrical outer contour that corresponds to the inner contour of the recess 63 and may, of course, also be, e.g., truncated cone-shaped, as well as a truncated cone-shaped inner contour, which is engaged by the bearing shell 64. The recess 63 in the joint housing 62 has, in turn, an opening, which is closed with a closing ring 65. To compensate dimensional tolerances in the axial and radial directions, the insert element 66 is provided with at least one intermediate element 71 made of an elastic material on its outer limiting surface facing the bottom area 72 of the joint housing 62. To compensate purely axial dimensional tolerances and to absorb axial impact forces acting on the free end of the pivot pin 61, the intermediate element 71 may be arranged only in the bottom of the front area of the insert element facing the recess 63, or it may be arranged on the insert element's cylindrical outer contour as an additional intermediate element 70 for the additional compensation of radial dimensional tolerances. In the case of a ball-and-socket joint as is shown in FIG. 3, the intermediate elements 70 and 71 consisting of an elastic material are again designed as an elastomer layer, which is vulcanized or bonded to the outer surface of the insert element 66.

Figure 4:
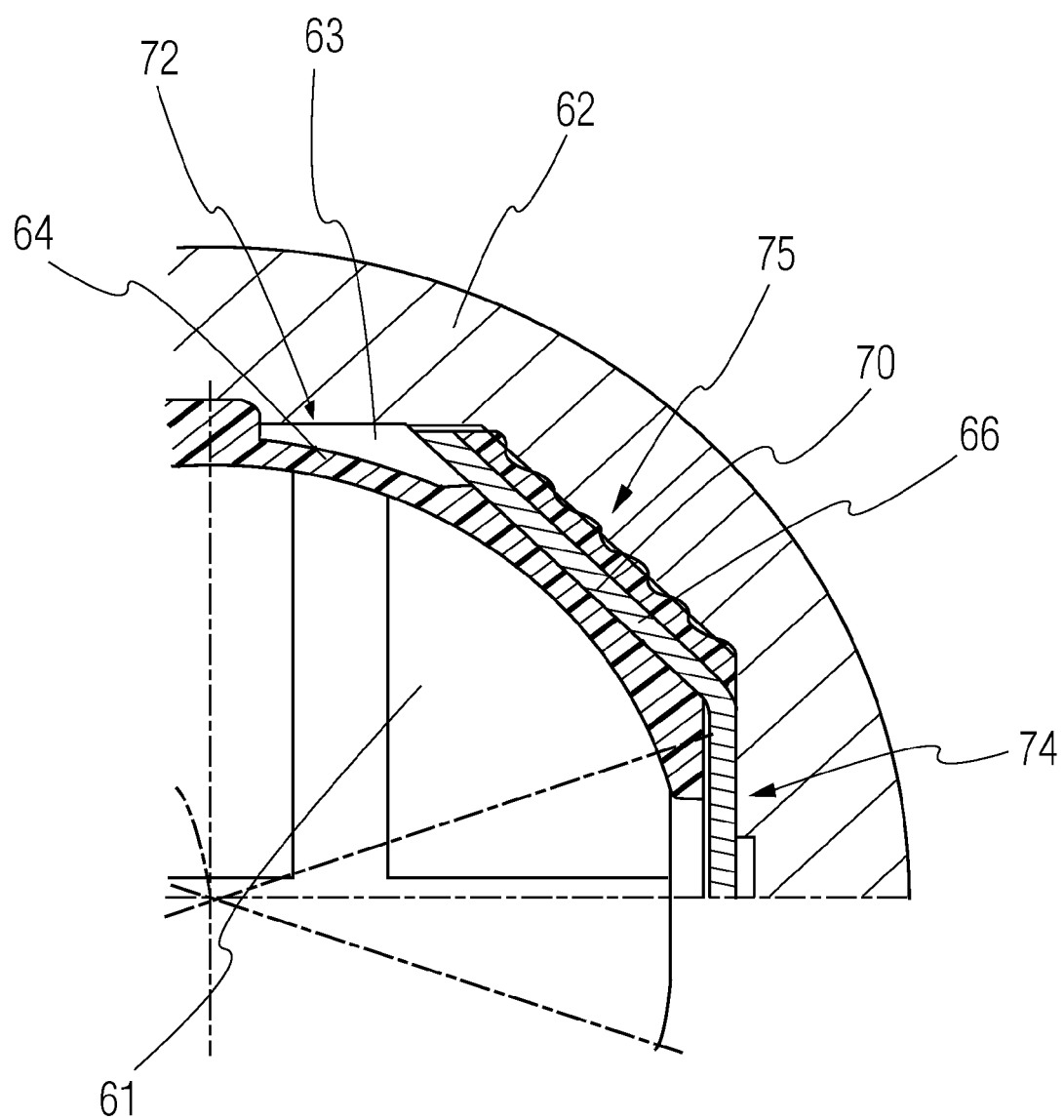
FIG. 4 is an enlarged partial sectional view through the bottom area of another exemplary embodiment of a ball-and-socket joint with the features of the second solution variant of the subject of the present invention.

FIG. 4 shows a detail of the bottom area of a ball-and-socket joint, which corresponds essentially to the other solution variant already described within the framework of the description in connection with FIG. 3. An elastomer element 66, which is designed, contrary to the view in FIG. 3, as a tilted sheet metal part, is located between the bearing shell 64 and the inner surface of the recess 63 of the joint housing 62 in this case as well. The recess 63 has a truncated cone-shaped design in the bottom area and consequently has both a vertical area 74, i.e., an area extending in parallel to the longitudinal axis 10 of the pivot pin of the non-deflected pivot pin 1, and an area 75 tapering toward the bottom area 72 of the joint housing 62. The insert element 66 is correspondingly adapted to this contour of the recess 63, so that a contact surface of the insert element 66 is obtained at the area 74 and a conical tilt parallel to the area 75 is obtained as well. Analogously to the design according to FIG. 3, an intermediate element 70 made of an elastic material, which is designed as an elastomer layer in the exemplary embodiment being shown, is located in the area of this conical tilt. This elastomer layer is able both to compensate tolerances between the adjacent components, i.e., the inner wall of the recess 63 and the outer contour of the conical area 75 of the insert element 66 and to absorb at the same time impact loads in the axial direction, which act on the pivot pin 61 and from there on the bearing shell 64 and, via the intermediate element 70, on the joint housing 62. The elastomer layer forming the intermediate element 70 at the insert element 66 may, of course, also be bonded.

Figure 5:
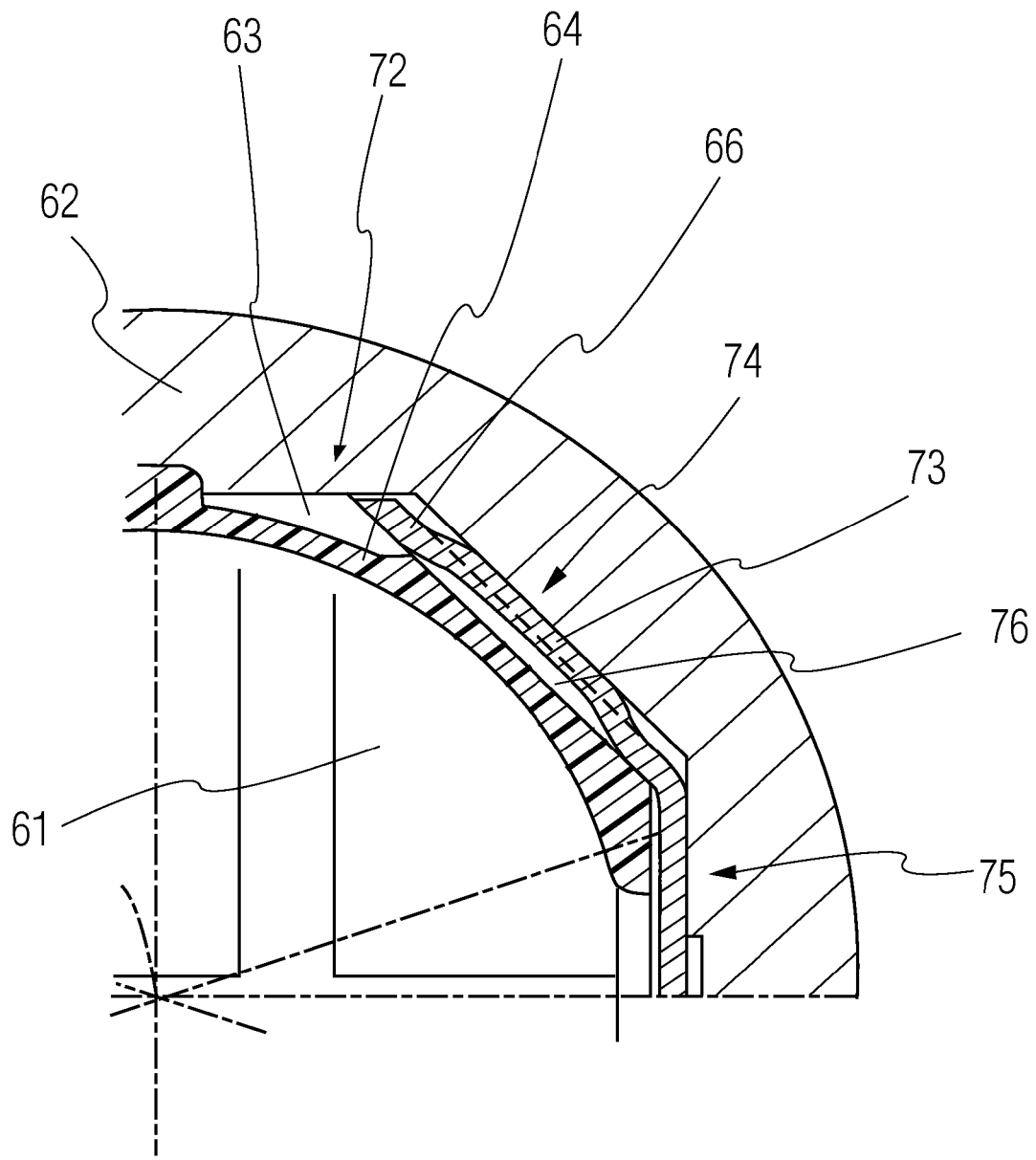
FIG. 5 is an enlarged partial sectional view corresponding to another exemplary embodiment of a ball-and-socket joint with the features of the second solution variant of the subject of the present invention.

An embodiment variant corresponding, in principle, to that in FIG. 4 is also shown in FIG. 5. The inner contour of the recess 63 of the joint housing 62 corresponds here to that of the ball-and-socket joint corresponding to FIG. 4.

The difference between the exemplary embodiment according to FIG. 5 and the variant being described here is that the insert element 66 itself is provided with springy areas 73 here. The spring action of the insert element 66 is determined here by both the material selected and the special shape. Corresponding to this embodiment variant, the insert element 66 is made of spring steel, and has in its conical area a plurality of springy areas 73 distributed over the circumference, which are preferably designed as beads. These beads are depressions, which are impressed into the sheet metal contour of the insert element 66 and extend in the direction of the inner surface of the recess 63 of the joint housing 62. Thus, a contact surface with the inner surface of the recess 63 is obtained only on the elevations present between the beads. Due to the elastic properties of the spring steel used, in conjunction with the design of the beads, forces acting on the pivot pin 61 in the axial direction, which are introduced from the pivot pin into the joint housing 62 via the bearing shell 64, can be absorbed to a certain extent by the fact that the intermediate space 76 formed between the bearing shell 64 and the insert element 66 disappears, so that the bead contour formed on the insert element 66 disappears completely in the extreme case. At the same time, increases in tolerance between the bearing shell 64 and the recess 63, which develop due to wear, can be compensated to a certain extent by the elasticity of the beads in conjunction with the material of the insert element 66.

The springy areas 73 of the insert element 66 may, of course, be designed not only as beads, but it is also possible to arrange elastic straps in the cone area of the insert element 66, which project over the installation space of the insert element 66, and the projecting outer contour of these straps forms a contact surface toward the inner side of the recess 63 in the conical area of the insert element 66 located adjacent to the bottom area 72, which is, however, not shown in the figures.

The different embodiments of all the solution variants shown improve the compensation especially of axial loads within the ball-and-socket joint and can, moreover, compensate a tolerance for a wear-induced increased clearance between the bearing shell and the joint housing. The measures described thus lead directly to a prolonged service life of the ball-and-socket joint according to the present invention compared with the embodiments known from the state of the art.

While specific embodiments of the invention have been shown and described in detail to illustrate the application of the principles of the invention, it will be understood that the invention may be embodied otherwise without departing from such principles.

The invention claimed is:

1. A ball-and-socket joint, comprising:
a pivot pin including a spherical joint area;
a bearing shell, said spherical joint area being accommodated rotatably and tiltably in said bearing shell;
a joint housing having a recess, said bearing shell being arranged in said recess of said joint housing, said recess having a step;
a closing ring radially arranged within said housing, said closing ring including an axially directed portion substantially wedge-shaped in cross section and an expanded diameter portion in direct contact with said step and fixed to said housing between said step and a beaded edge of said housing fixing said bearing shell in said joint housing in an axial longitudinal direction of said pivot pin by at least one surface pair with contact surfaces between said housing and said bearing shell, said expanded diameter portion having a diameter greater than any diameter of said axially directed portion, said expanded diameter portion having a peripheral edge surface in direct contact with said housing;
an intermediate element made of an elastic material only covering said contact surfaces of said closing ring along the axially directed portion and arranged between said closing ring and said bearing shell, whereby said intermediate element is in contact with said bearing shell and said closing ring; and
a sealing bellows connected to said joint housing and connected to said pivot pin.

2. A ball-and-socket joint in accordance with claim 1, wherein said intermediate element is designed as an elastomer layer.

3. A ball-and-socket joint in accordance with claim 1, wherein said intermediate element is vulcanized to said closing ring.

4. A ball-and-socket joint in accordance with claim 1, wherein said intermediate element is bonded to said closing ring.

5. A ball-and-socket joint in accordance with claim 1, further comprising:
an additional intermediate element made of an elastic material and arranged between said closing ring and an inner wall of said recess accommodating said bearing shell.

6. A ball-and-socket joint in accordance with claim 5, wherein said additional intermediate element is designed as an elastomer layer.

7. A ball-and-socket joint in accordance with claim 5, wherein said additional intermediate element is vulcanized to said closing ring.

8. A ball-and-socket joint in accordance with claim 7, wherein said bearing shell is rotationally fixed in relation to a longitudinal axis of said pivot pin.

9. A ball-and-socket joint in accordance with claim 5, wherein said additional intermediate element is bonded to said closing ring.

10. A ball-and-socket joint according to claim 1, wherein said closing ring is arranged between said bearing shell and said joint housing in a radial direction; and
said intermediate element is arranged between and in contact with said bearing shell and said closing ring in said radial direction.

11. A ball-and-socket joint according to claim 10, wherein said intermediate element is prestressed.

12. A ball-and-socket joint according to claim 1, wherein said bearing shell has thin areas contacting said spherical joint area, said thin areas arranged between said spherical joint area and said axially directed portion of said closing ring in a radial direction perpendicular to said longitudinal direction, said axially directed portion of said closing ring being arranged between said thin areas and said joint housing in said radial direction, and said intermediate element being arranged between and in contact with said thin areas and said axially directed portion in said radial direction.

13. A ball-and-socket joint according to claim 12, wherein said axially directed portion of said closing ring has a conical inner surface or a spherical inner surface.

14. A ball-and-socket joint according to claim 13, wherein said recess has an outer cylindrical hole part provided with an opening, said thin areas of said bearing shell are directed towards said opening, said closing ring having a cylindrical outer surface; and
an additional intermediate element made of an elastic material is arranged between and in contact with said cylindrical outer surface of said closing ring and said joint housing in said cylindrical hole part of said recess.

15. A ball-and-socket joint according to claim 14, wherein said axially directed portion of said closing ring is designed as a ring projection in said axial direction toward said inside of said joint housing, said expanded diameter portion of said closing ring having a larger external diameter than said axially directed portion and being in contact with a step of said joint housing.

16. A ball-and-socket joint according to claim 15, wherein said intermediate element is prestressed.

17. A ball-and-socket joint according to claim 16, wherein said joint housing comprises a beaded edge, said radially directed area of said closing ring being axially fixed between said step and said beaded edge.

18. A ball-and-socket joint according to claim 1, wherein said joint housing comprises an opening, said opening of said joint housing being closed by means of said sealing bellows, which is arranged between said joint housing and said pivot pin, said sealing bellows provided as a separate part from said closing ring.

19. A ball-and-socket joint according to claim 1, wherein said contact surfaces are arranged between said bearing shell and said closing ring in said radial direction.

20. A ball-and-socket joint comprising:

a pivot pin including a spherical joint area;

a bearing shell, said spherical joint area being accommodated rotatably and tiltably in said bearing shell;

a joint housing having a recess, said bearing shell being arranged in said recess of said joint housing, said recess including a step;

a closing ring substantially wedge-shaped in cross section, said closing ring being radially arranged between said bearing shell and said joint housing, said closing ring having an expanded diameter area in direct contact with said step and fixed to said housing between said step and a beaded edge of said housing fixing said bearing shell in said joint housing in an axial longitudinal direction of said pivot pin with a first contact surface and a second contact surface located between said housing and said bearing shell, said expanded diameter area having an outer edge surface in direct contact with said housing, said first contact surface being disposed opposite said bearing shell and said second contact surface being disposed opposite said joint housing;

an intermediate element made of an elastic material covering and in contact with each of said contact surfaces and arranged between said bearing shell and said closing ring and arranged between said closing ring and said joint housing, said intermediate element engaging said first contact surface and said second contact surface such that said intermediate element only covers said closing ring along the axially directed portion, said intermediate element preventing radially directed tilting between said bearing shell and said closing ring; and a sealing bellows separately formed from said closing ring and said intermediate element and provided as an enclosure surface, said sealing bellows being connected to said housing and connected to said pivot pin and arranged between said pivot pin and said joint housing.

* * * * *